March 3, 1964    F. A. GORY    3,122,812
TILE MANUFACTURING MACHINE
Filed April 4, 1961    3 Sheets-Sheet 1
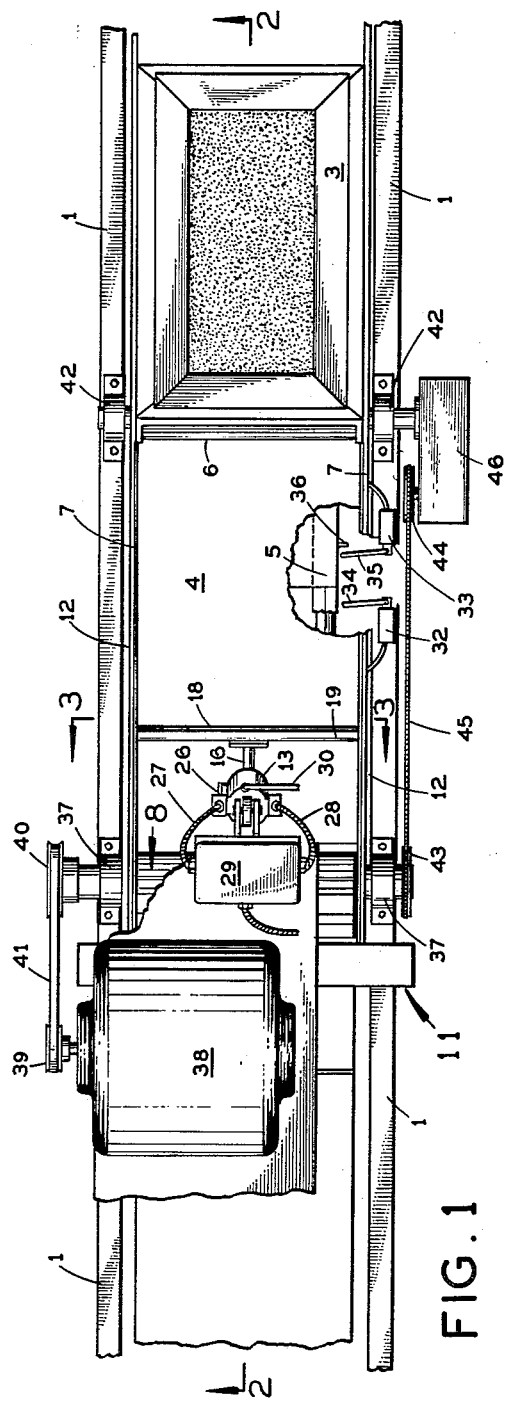
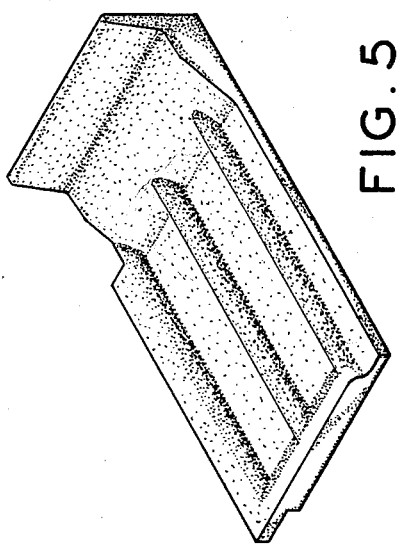
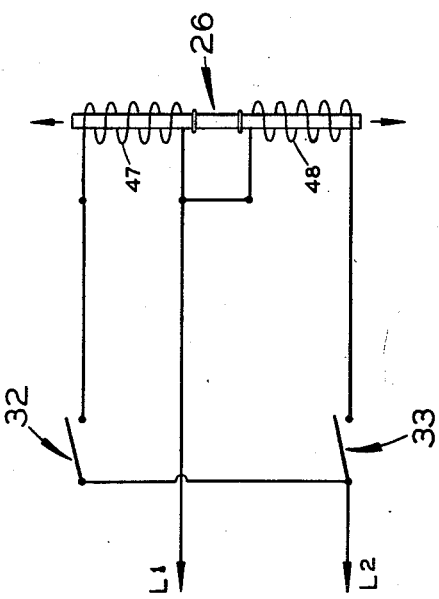
INVENTOR.
FRANK A. GORY
BY

INVENTOR.
FRANK A. GORY

March 3, 1964 F. A. GORY 3,122,812
TILE MANUFACTURING MACHINE
Filed April 4, 1961 3 Sheets-Sheet 3

*INVENTOR.*
FRANK A. GORY
BY

United States Patent Office 3,122,812
Patented Mar. 3, 1964

3,122,812
TILE MANUFACTURING MACHINE
Frank A. Gory, 5166 E. 11th Ave., Hialeah, Fla.
Filed Apr. 4, 1961, Ser. No. 100,572
1 Claim. (Cl. 25—43)

This invention relates in general to machines for the manufacture of structural and/or ornamental tile and more particularly to a machine for the automatic continuous manufacture of tile of uniform size and shape from self-setting plastic materials such as concrete, kaolin and refractory materials while the materials are in a plastic state.

Tile machines previous to this invention were necessarily operated at relatively low speeds and required considerable manual manipulation for feeding and controlling the plastic materials therein. Furthermore, the well known rotary compacting means failed to produce uniform tile without voids and uniform density particularly in the case of tile having substantial portions thereof offset from the main body of the tile.

The present invention overcomes the above objections and disadvantages by the provision of an improved means for feeding the plastic material from a hopper means without the introduction of voids and includes a reciprocating tamping mechanism for compacting the offset portions of the plastic material in the pallet carrying same.

A further object of the invention is the provision of a pallet loading means and a reciprocating power tamper for uniformly loading a plurality of pallets moving in a linear path.

A further object of the invention is the provision of an open chamber for receiving plastic materials continuously propelled by gravity and by a rotary power feed for tamping by reciprocating means.

Another object of the invention is the provision of an electric means for synchronizing the tamping means in predetermined relation with each moving pallet.

These and other objects and advantages in one embodiment of the invention are described and shown in the following specification and drawings in which:

FIG. 1 is a fragmentary plan view of a tile machine in reduced scale illustrating the relative arrangement of components.

FIG. 4 is a schematic diagram of the electric control circuit.

FIG. 5 is a perspective view of a typical offset tile in reduced scale manufactured by the machine.

Figure 2:
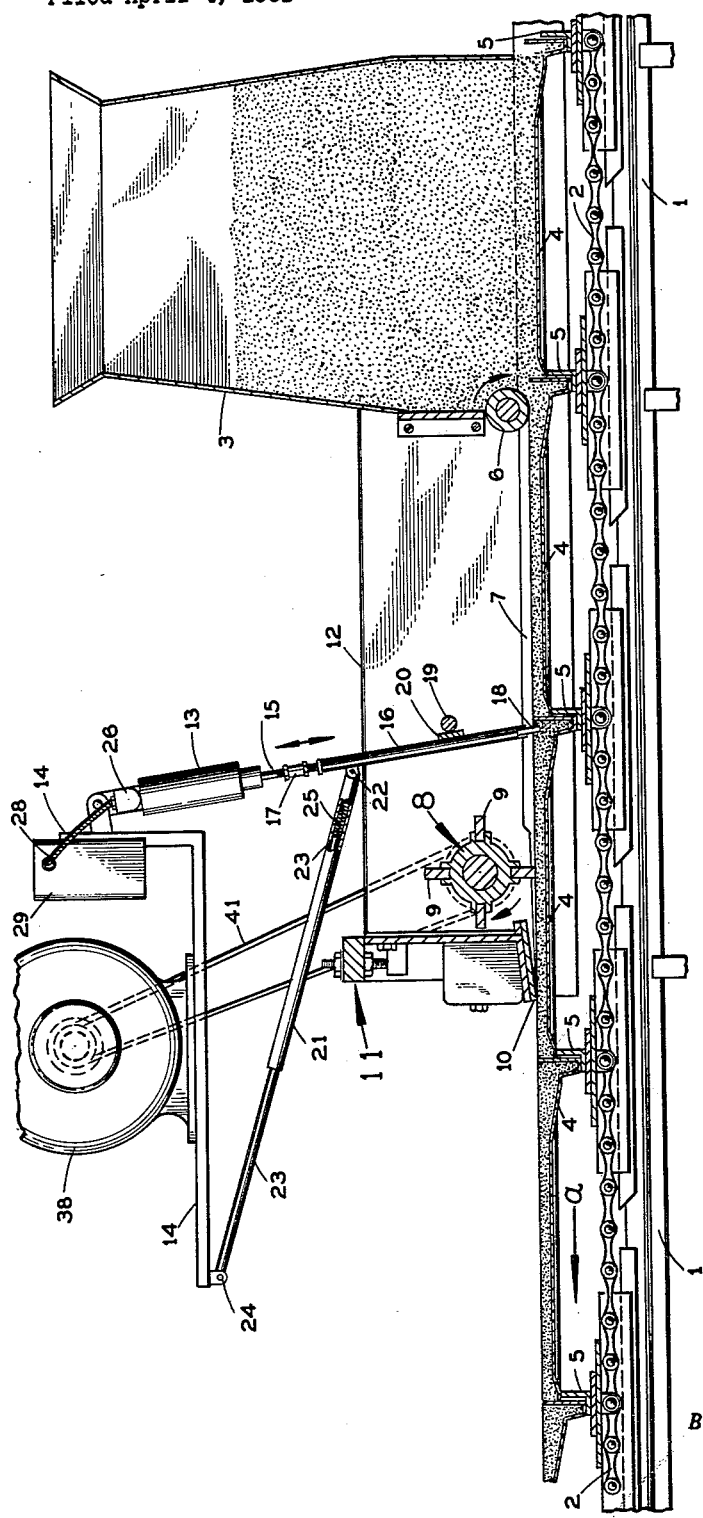
FIG. 2 is a cross sectional side elevation taken through section line 2—2, FIG. 1.

This tile manufacturing machine uses the well known endless conveyor means for transporting pallets or individual molds in linear succession substantially the same as shown in applicant's U.S. Patent 2,948,043. Referring to FIGS. 1 and 2, a main frame 1 is constructed and adapted to guide a conveyor chain 2 in a linear direction illustrated by arrow a, FIG. 2. A hopper 3 having downward divergent sides is secured to frame 1 with the open bottom positioned directly over the path of movement of the pallets 4 which are carried on conveyor chain 2 by appropriate supports 5 which are secured to master links in the conveyor chain at predetermined equal distances.

A cylindrical roller 6 is journalled for rotation on frame 1 transverse the path of movement of the pallets and positioned in close proximity to the lower edge of the exit side of the hopper 3, as shown in FIG. 2.

Contrary to accepted practice, when this roller is rotated in the direction shown by arrow, the material in the hopper gravitating on the pallets 4 will be primarily compacted by the roller without introducing voids into the material while being carried by the pallets. This feeding means eliminates the introduction of void common to vane type feeders.

The pallets are guided in close relation to side plates 7—7 secured to the frame in parallel relation, as shown FIG. 1, for confining the pallets and the material thereon during transit to the sizing and smoothing mechanism to be hereinafter described.

A rotary impeller 8 having radial blades 9 is journalled for rotation transverse the path of movement of the pallets a predetermined distance from roller 6 and is adapted for rotation in the direction shown by arrow, FIG. 2, for secondary compacting of the material on the pallets in order to pre-size the thickness of the tile carried by the pallets before entry into the smoothing blade 10 which is adjustably supported to frame 1 by a suitable screw means 11.

Parallel spaced plates 12—12 secured to opposite sides of frame 1 confine the material within the space between roller 6 and the rotary impeller 8. Under normal conditions, the positions of the roller 6 and the impeller 8 are adjusted to maintain a relatively uniform flow of material on the pallets within the confines of the plates 12—12. However, the opening above the plates 12 provides easy access for the addition or the removal of material by manual means under certain conditions of periodic irregular feed in the hopper 3 and thus avoids a complete shutdown of the machine while normal hopper feed is reestablished.

Figure 3:
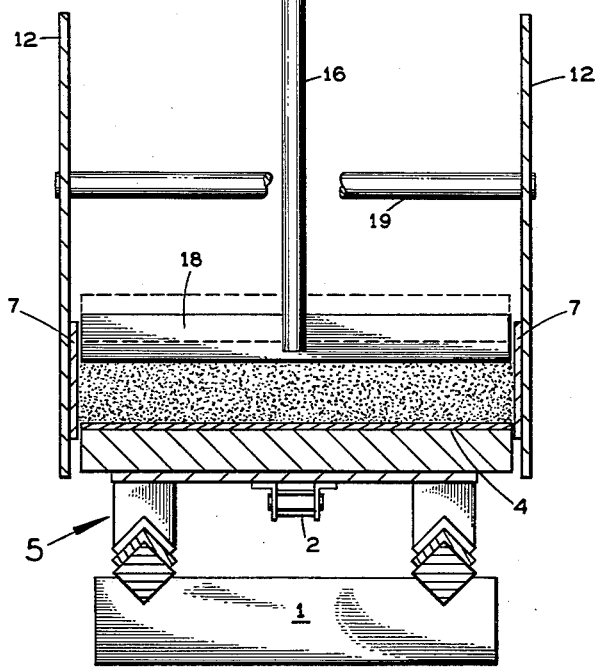
FIG. 3 is an enlarged cross sectional end view taken generally through section line 3—3, FIG. 1.

In order to overcome the inadequacies of proper compacting of material in the pallets when the latter have relatively deep offset portions, such as the tile illustrated in FIG. 5, a tamping mechanism is positioned within the confines of plates 12—12 which consists of a conventional double acting pneumatic cylinder 13 with piston and ports not shown. The cylinder is pivoted at one end to a support member 14 which in turn is secured to frame 1. The piston rod 15 of the cylinder is adjustably secured to a tamper shaft 16 by a threaded coupling 17. A ram 18 is rigidly secured to shaft 16 and positioned transverse the path of movement of the pallets, as shown in FIG. 3.

A limit rod 19 is secured to tamper shaft 16. A resilient brace for the ram assembly consists of a tubular member 21 and is secured at one end to shaft 16 by pivot 22 and a rod 23 is telescoped within tube 21 secured to support 14 by pin 24. The end of rod 23 within tube 21 bears against a compression spring 25 within tube 21 for normally urging bar 16 into position, shown FIG. 2, against limit rod 19.

An electro-magnetic valve actuator 26 secured to the cylinder 13 is connected to and electrically energized by a relay box 29. A source of compressed air is connected to conduit 30 for energizing cylinder 13 through the valve actuator 26. A conduit 31 is connected to the valve actuator for supplying compressed air to the lower end of the piston in the air cylinder 13.

Referring to FIG. 1, a pair of normally open momentary electric switches 32 and 33 are adjustably secured to frame 1 with their actuating arms 34 and 35 positioned adjacent the pallet supports 5. Stud 36 secured in one outer side of each support 5 is for the purpose of successively engaging the actuator arms 34 and 35 for operating the switches 32 and 33 in sequence when the conveyor chain is driven, thus, providing for the sequential dual operation of both switches corresponding to a predetermined position of each pallet during its transit through the loading portion of the machine.

The rotary impeller 8 is journalled on bearings 37—37 on frame 1 and driven by motor 38 belted thereto by pulleys 39, 40 and belt 41.

The feed roller 6 is journalled on bearings 42—42 and driven by sprockets 43, 44 and chain 45 through a speed reducer 46. Thus, the impeller 8 and the feed roller 6 are simultaneously rotated in timed relation when motor 38 is energized and because of the necessity of timing, the rotation of impeller 8 and the roller 6 in relation to the linear movement of the conveyor chain 2, the speed reducer 46 is preferred to be capable of adjustable speed reduction.

Referring to FIG. 4, the dual solenoids 47 and 48 in the actuator 26 are connected to a source of power $L_1$—$L_2$ through switches 32 and 33, respectively, for controlling the double action of the air cylinder.

In operation and under the assumption that the conveyor chain 2 is driven by a power source, not shown, and the hopper is filled with plastic material the pallets will move in the direction shown by arrow $a$, shown in FIG. 2, and each pallet will be gravity loaded with material which will be primarily compacted and levelled by roller 6. When the offset portion of each pallet reaches the zone of impact of the ram bar 18, then stud 36 will momentarily operate switch 33 and energize the actuator 26 and operate cylinder 13 for its down stroke and the ram 18 will compact the plastic material in the offset portion of the pallet. Since the pallet is in motion, the ram will be carried forward a short distance under the restraining action of spring 25 in the brace 21—23. The stud 36 will then release engagement with switch 33 and operate switch 32 and the resulting operation of the actuator and cylinder will retrieve the ram to its normal rest position above the material in the pallet.

Following the ramming operation, each pallet is moved under the secondary sizing impeller and the material is further compacted prior to moving under the smoothing blade 10.

It is to be noted that a small surplus of plastic material will be carried rearward by the blades 9 of the impeller to rejoin the material on oncoming pallets.

It has been found in practice that a satisfactory conveyor velocity is between 90 and 100 feet per minute which provides for a manufacturing speed of approximately 70 tiles per minute with the elements proportioned substantially as shown in the drawings.

It is now apparent that the air cylinder may be operated by a valve actuator directly responsive to the movement of the conveyor without utilizing the intermediate electric circuit previously described and it will also be understood that as an alternate the pneumatic system described may be replaced by a substantially equivalent hydraulic system with a fluid instead of air as the energized medium.

It is to be understood that other modifications in the above described construction utilizing the features described are intended to come within the scope of the appended claim.

Having described my invention, I claim:

In a machine for the manufacture of tile having an offset projecting therefrom a means forming a frame,
a plurality of pallets,
each of said pallets including a cavity corresponding to said offset,
a conveyor means in said frame constructed and adapted to transport said pallets thereon in like end to end formation in a substantially horizontal path including power means for driving same at a predetermined linear speed when energized,
a hopper means on said frame positioned above said conveyor means constructed to contain a supply of plastic material for gravitation onto said pallets when the latter are transported under said hopper means,
a roller means journalled for rotation on said frame about an axis transverse and above said path positioned in a close proximity with a lower edge of the outlet side of said hopper means for feeding and primary compacting a layer of said material on said pallets when rotated when the latter are transported from under said hopper means,
an impeller means journalled for rotation on said frame about an axis transverse and above said path and spaced from said roller means forming a tamping zone therebetween,
said impeller adapted to compact and size said material on each of said pallets to a predetermined thickness when the latter are transported from said zone,
power means for rotating said roller and impeller means at predetermined synchronized speeds when energized,
tamping means pivoted to said frame above said zone for angular oscillation in the direction of movement of said pallets between a predetermined idle and a predetermined displaced position,
means for urging said tamping means into said idle position,
said tamping means constructed and adapted to move to an extended position and sequentially ram said material in each said cavity in each of said pallets while moving in said zone and be moved thereby in said extended position from said idle to said displaced position during each reciprocation thereof when sequentially and momentarily energized,
a source of pressurized energy,
abutment means equi-spaced on said conveyor means for linear movement therewith positioned to correspond with the spacing of each said cavity in each of said pallets on said conveyor means,
a control means connected to said source of energy and said tamping means positioned in the path of movement of said abutment means and constructed and adapted to be sequentially and momentarily operated thereby to energize said tamping means a single stroke for compacting said material in each said cavity in each said pallet when said power means are energized.

References Cited in the file of this patent

UNITED STATES PATENTS

| | | |
|---|---|---|
| 1,377,188 | Domine | May 10, 1921 |
| 2,531,574 | Lang | Nov. 28, 1950 |
| 2,641,819 | Peavy | June 16, 1953 |
| 2,644,217 | Agar | July 7, 1953 |
| 2,650,408 | Agar | Sept. 1, 1953 |
| 2,683,297 | Lea | July 13, 1954 |
| 2,948,043 | Gory | Aug. 9, 1960 |

FOREIGN PATENTS

| | | |
|---|---|---|
| 105,651 | Australia | Oct. 27, 1938 |